Figure 1A:
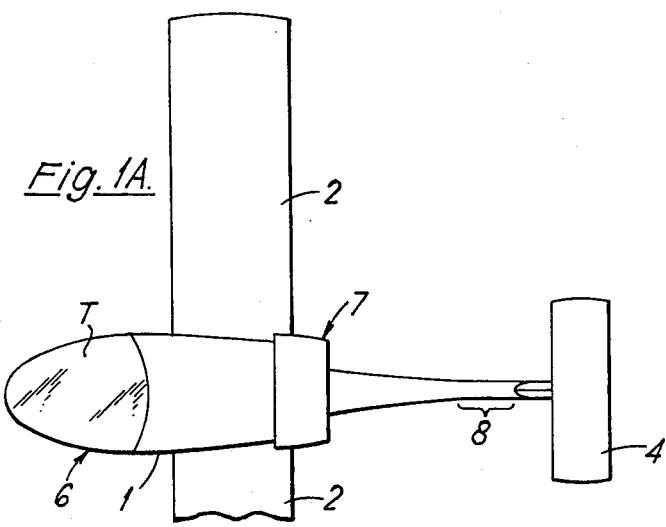

United States Patent [19]
Hempenstall

[11] 3,938,761
[45] Feb. 17, 1976

[54] AIRCRAFT WITH IMPROVED FIELD OF VIEW FOR PASSENGERS

[75] Inventor: John Hempenstall, London, England

[73] Assignee: Scenic Flying Limited, Surrey, England

[22] Filed: Oct. 17, 1973

[21] Appl. No.: 407,133

[30] Foreign Application Priority Data
Oct. 23, 1972    United Kingdom............... 48749/72

[52] U.S. Cl.................. 244/13; 244/55; 244/118 P
[51] Int. Cl.².......................................... B64C 1/00
[58] Field of Search........ 244/13, 46, 55, 67, 118 P, 244/120

[56] References Cited
UNITED STATES PATENTS

| | | | |
|---|---|---|---|
| 1,109,891 | 9/1914 | Young | 244/120 |
| 2,339,338 | 1/1944 | Karlik | 244/13 |
| 2,558,501 | 6/1951 | Turner | 244/67 |
| 3,191,888 | 6/1965 | Sklenka | 244/55 |
| 3,462,099 | 8/1969 | Hollendieck et al. | 244/55 |
| 3,572,615 | 3/1971 | Firestone | 244/13 |
| 3,599,903 | 8/1971 | Handler | 244/13 |
| 3,669,367 | 6/1972 | Rhodes et al. | 244/46 |

FOREIGN PATENTS OR APPLICATIONS

| | | | |
|---|---|---|---|
| 420,313 | 11/1934 | United Kingdom | 244/55 |
| 528,911 | 11/1940 | United Kingdom | 244/13 |

Primary Examiner—George E. A. Halvosa
Assistant Examiner—Barry L. Kelmachter
Attorney, Agent, or Firm—Shapiro and Shapiro

[57] ABSTRACT

An aircraft designed to afford passengers an unrestricted view for "sightseeing" or other purposes. Passenger accommodation extends to the foremost part of a fuselage and is enclosed by a cabin transparency extending to cover substantially the entire field of view of passengers from a fixed position. The pilot of the aircraft is accommodated above and behind the passengers, the aircraft's powerplant also being disposed behind the passenger accommodation.

8 Claims, 15 Drawing Figures

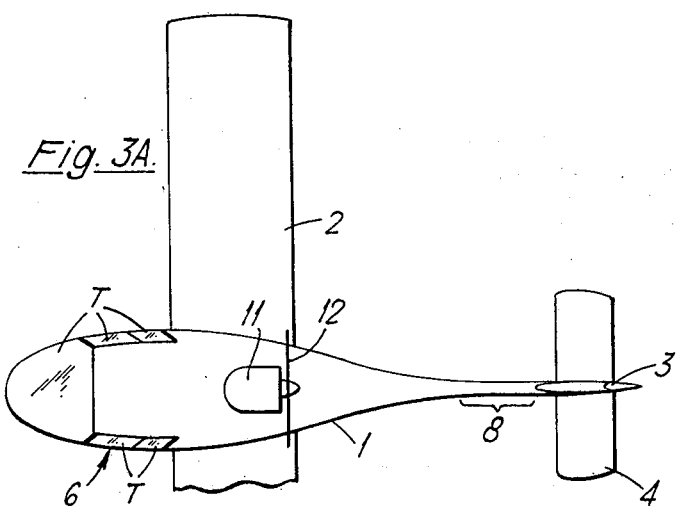
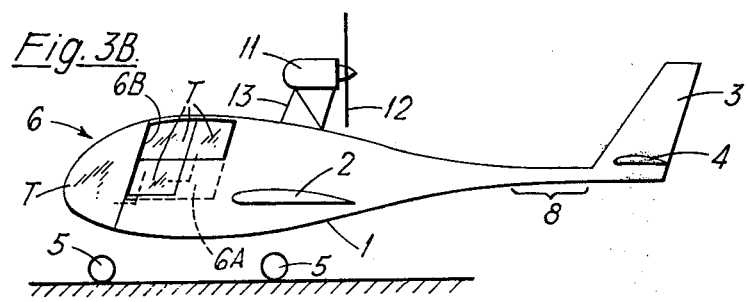
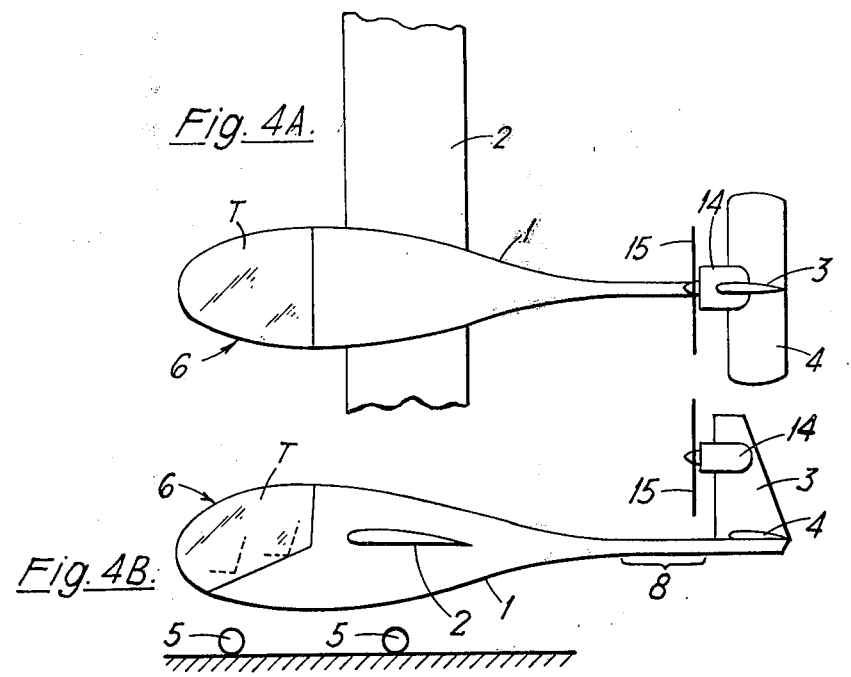

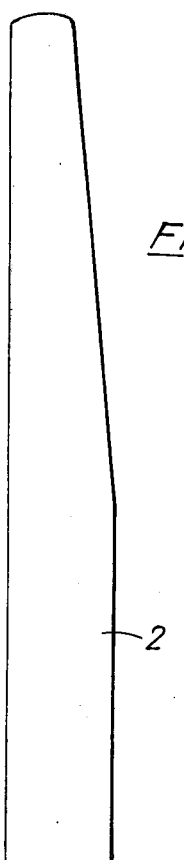
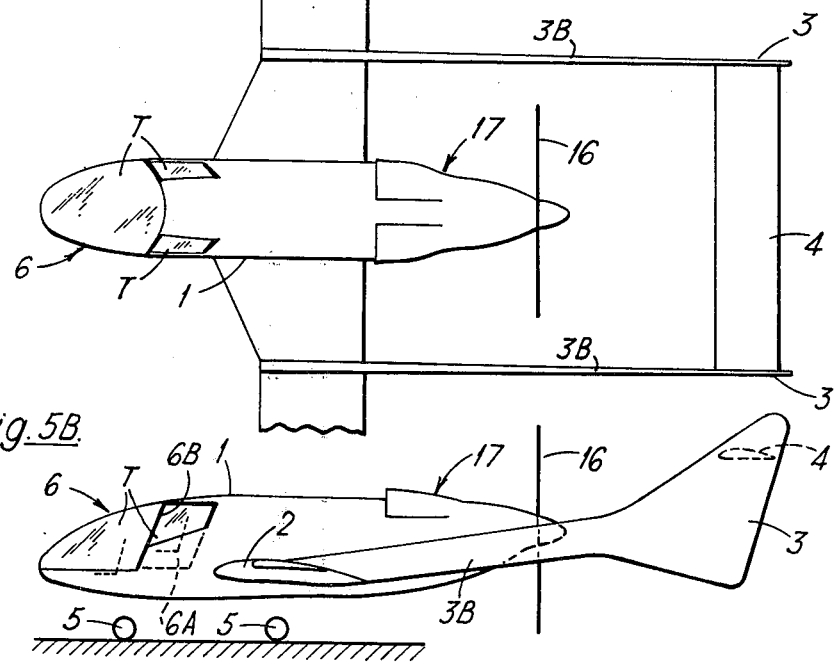
Fig. 5A.
Fig. 5B.

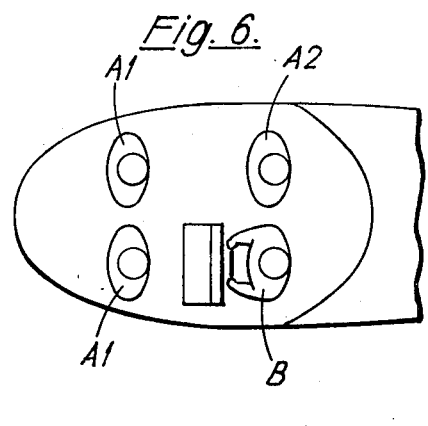
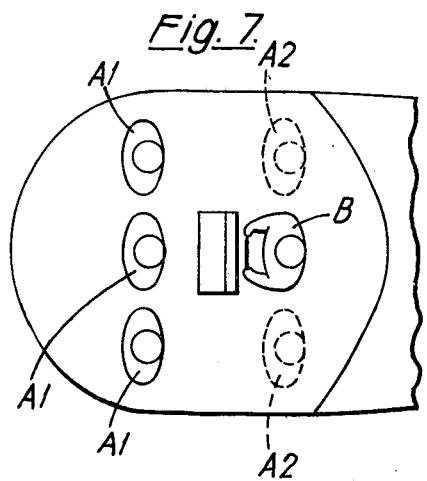
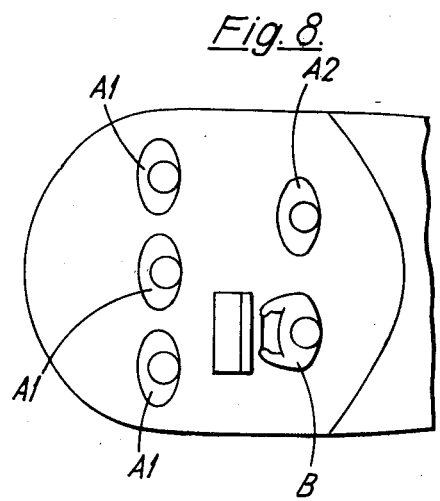
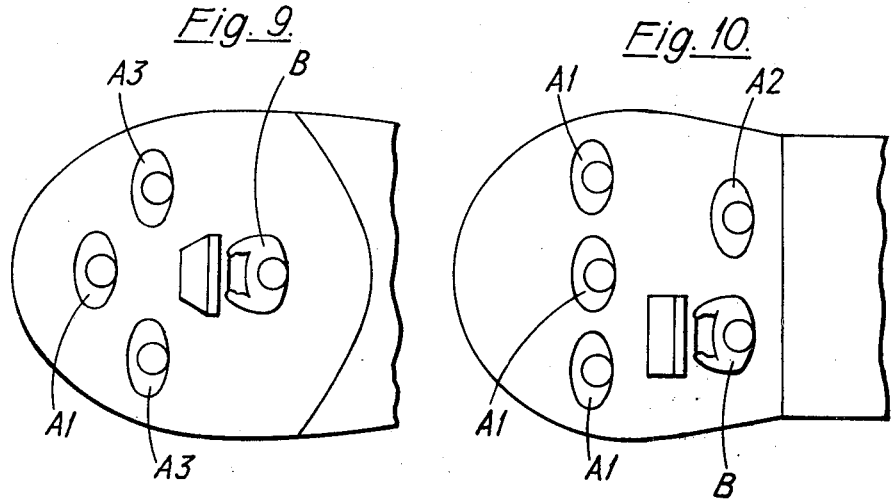

AIRCRAFT WITH IMPROVED FIELD OF VIEW FOR PASSENGERS

The present invention relates to aircraft.

Underlying the invention is the aim of providing an aircraft tailored specifically to the role of taking groups of passengers on low-level "sightseeing" flights over areas of natural beauty or the like attractions, and thus the primary requisite of such an aircraft is that the passengers are as far as possible afforded an unrestricted view from the aircraft. Furthermore since the aircraft is, as indicated, to be utilised primarily in the field of "pleasure" flying passenger comfort is of the essence, so that, for example, the levels of noise and vibration from the aircraft's powerplant to which the passengers will be subject must be kept to a minimum. Hitherto, such aerial sightseeing has been discouraged by the lack of suitably appointed aircraft designed specifically to meet the needs of the aerial tourist. "Pleasure flights" hitherto have generally been made in standard light transport or sport or training aircraft, that is to say aircraft primarily designed for a different role.

The present invention resides in an aircraft comprising passenger accommodation at a first seating level extending to the foremost part of a fuselage and enclosed substantially entirely (that is to say, save for inevitable structural members) by transparent skins so far as the field of view of passengers within such accommodation is effective from a seat of which the location is fixed and having at a second higher seating level and behind the passenger accommodation accommodation for a pilot and his equipment, the powerplant of the aircraft being behind said passenger accommodation, and the aircraft having lift surfaces selected to be efficient at cruising speeds compatible with safe low flying for sightseeing or observation purposes and so arranged as not substantially to obscure such effective field of view of said passengers.

The passengers are thus afforded an unrestricted view for sightseeing and remain undisturbed by the pilot (who conventionally sits foremost), the pilot himself being afforded adequate vision by virtue of his elevated position. Furthermore, the powerplant is situated to the rear of the passengers so as not to obscure their field of view and so as to minimise the levels of noise and vibration reaching them.

It will be appreciated that for sightseeing purposes, the aircraft should be capable of flying as low and slow as permissible. It is thus contemplated that for a fixed-wing aircraft a suitable mainplane will be configured in accordance with one or other of the two following types, that is to say either a comparatively high aspect-ratio wing (e.g. greater than 12) as used on so-called "motor-gliders", or a wing of more conventional aspect ratio provided with suitable high-lift devices (such as leading-edge slots and trailing-edge flaps) as used on so-called STOL (short take-off and landing) aircraft. The choice of which wing-type to use will to some extent depend on the operating conditions contemplated for the aircraft. An aircraft with a high aspect-ratio wing is likely to be able to cruise at lower power levels than one with a STOL wing but will be more cumbersome to handle and will lack the short-field performance of the STOL aircraft which might be of prime importance in many areas where aircraft according to the invention are likely to operate. In the accompanying drawings a high aspect-ratio wing is indicated in the example of FIG. 5A and a STOL wing in FIGS. 1A, 2A, 3A and 4A. However the configurations illustrated are to be regarded as notional rather than definitive examples of each type since the actual configurations adopted will depend on many other practical considerations apparent to those skilled in the art but which are not, apart from the requirement that the wings do not obscure the field of view of passengers, directly concerned with the subject of the present invention.

Similarly, details of the aircraft's undercarriage are omitted since this may be of any convenient conventional type, either retractable or fixed, having wheels, skis or floats.

Although the invention is described herein exclusively in terms of fixed-wing aircraft the possibility of constructing a suitable rotary-winged variant, whether a gyroplane or helicopter, is not ruled out.

Figure 1B:
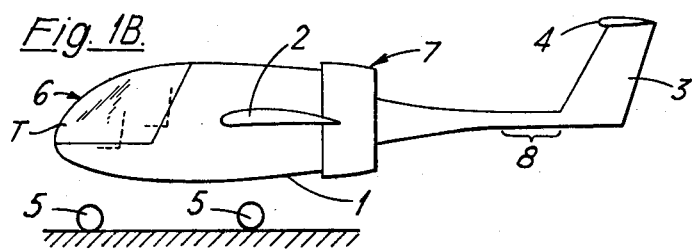
Figure 2A:
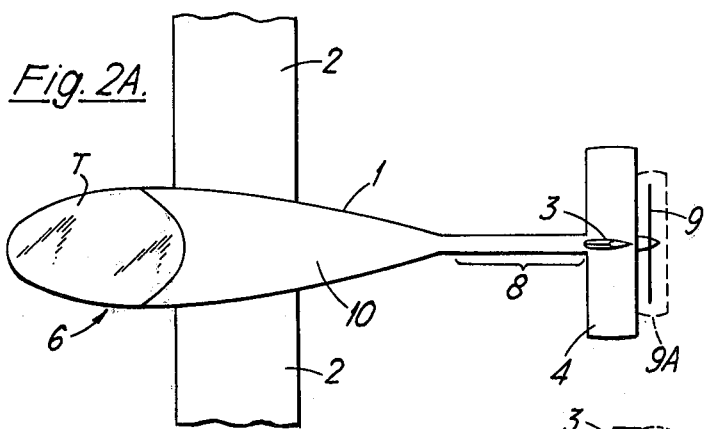
Figure 2B:
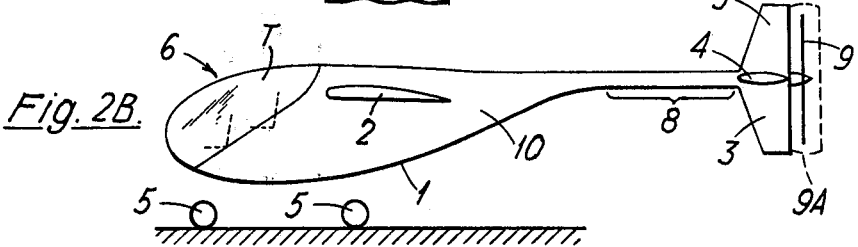

In the accompanying drawings:

FIGS. 1A and 1B are respectively schematic plan and elevation views of one embodiment of an aircraft according to the present invention suitable for carrying 3 to 5 passengers, and FIGS. 2A and 2B; 3A and 3B; 4A and 4B; and 5A and 5B are similar views of four further embodiments. The intention of these drawings is to indicate some examples of the various arrangements of the accommodation, lifting surfaces and propulsive systems amenable to aircraft according to the invention, considerable recombination of the various basic features illustrated being possible.

FIG. 6 is a schematic plan view of a cabin suitable for incorporation in any of the aircraft illustrated in the preceeding Figures, indicating one preferred seating arrangement and FIGS. 7 to 10 are similar views indicating further seating arrangements.

Referring to FIGS. 1A, 1B to FIGS. 5A, 5B, each illustrate an aircraft comprising a fuselage 1, (preferably of monocoque construction and composed primarily of glass-reinforced plastics), mainplane 2, fin (or fins) 3 and tailplane 4. The mainplane, fin and tailplane are provided with conventional roll, yaw and pitch control surfaces respectively (not shown). The aircraft's undercarriage is notionally indicated at 5. Situated at the foremost part of the fuselage is a cabin 6 for the passengers and a pilot, having a transparencey 'T'. As indicated in broken line two seating levels are provided, the lower, (forward) level being for passengers and the upper, (rear) level being for the pilot and (in some cases) further passengers. Various seating arrangements and other cabin details will be discussed later.

Referring now to FIGS. 1A and 1B only, the aircraft illustrated therein is of mid-wing configuration with a 'T' tail and incorporates a ducted fan, generally indicated at 7, for propulsion. The fan can be driven by any suitable powerplant, viz. a gas turbine or a reciprocating or rotary-piston engine. However, one type of ducted fan system which is considered to be particularly amenable to aircraft according to the invention is the low pressure ratio (e.g. 1.03:1 to 1.05:1) variable-pitch turbo-fan. Such fans produce inherently low noise levels due to the high bypass ratio and to the low fan tip speeds utilised. Again, they satisfy the propulsion requirements of STOL aircraft in that they are characterised by a high ratio of take-off thrust to cruise thrust, the availability of reverse thrust, and rapid thrust response so that accurate, high rate-of-descent approaches can be made and the maximum use of reverse thrust made for deceleration purposes on the ground run.

It is envisaged that in an aircraft as illustrated in FIGS. 1A and 1B, wherein the passenger accommodation is disposed right at the front of the aircraft and some distance forward of the mainplane, some means will be required for adjusting the centre of gravity of the aircraft in accordance with the weight of passengers carried. For example if the aircraft is to be flown with a reduced complement of passengers, or ferried empty, the centre of gravity of the basic aircraft structure must be brought forward to compensate for the reduced load in the nose. This could be achieved with water (or other) ballast or by varying the geometry of the aircraft. In the latter case it is proposed that a part of the rear fuselage (viz the constant-section part indicated at 8) be telescopic so as to be able to shift the empennage forward or back. Centre of gravity adjustments using the telescopic fuselage would normally be made on the ground before flight, but it is also envisaged that a telescopic fuselage could be operated when airborne as an additional (or alternative) form of pitch control. Rudder or elevator controls which have to traverse the telescopic section could be in the form of splined torsion shafts, i.e. themselves telescopic. As an alternative to having a telescopic fuselage, the fuselage could be provided with one or more removable sections with suitable linking of controls at each joint. It is further proposed that centre-of-gravity control could be achieved by changing the geometry or disposition of the mainplane 2; for example each wing could be pivotted at its root (or any other span-wise position) so that the length of wing outboard of such pivot can be adjustably swept forward or back.

Turning now to FIGS. 2A and 2B, there is illustrated a high-wing version of the invention, having a tail-mounted "pusher" propeller 9, the engine for which is located in the region 10 of the fuselage 1. The means for controlling centre-of-gravity discussed above are similarly available to this embodiment; should a variable geometry fuselage be used, the drive shaft from 10 to 9 will be provided with suitable splined joints. In a modification of this embodiment the engine is tail-mounted.

In the embodiment of FIGS. 3A and 3B the aircraft is of low-wing configuration with a conventional tail, and has a pylon-mounted engine 11 driving a "pusher" propeller 12. The means for controlling centre-of-gravity discussed above are available and furthermore a variable geometry pylon 13 may be incorporated for moving the engine 11 between two or more fore and aft positions as a means of centre-of-gravity control.

In the embodiment of FIGS. 4A and 4B the aircraft is of mid-wing configuration with a fin-mounted engine 14 driving a propeller 15 either a "tractor" propeller forward of the fin (as illustrated) or a "pusher" propeller to the rear of the fin. Centre-of-gravity control can be effected as discussed above with reference to the FIGS. 1A, 1B example.

The embodiment shown in FIGS. 5A and 5B is of a low-wing, twin-boom configuration, driven by a "pusher" propeller 16. The engine for the propeller is housed in the rear of the fuselage 2, as generally indicated at 17, and may (as indeed may the engine for the FIGS. 2A, 2B; 3A, 3B; and 4A, 4B examples) be any suitable type of aircraft powerplant viz a gas turbine, or a reciprocating or rotary piston engine. Alternatively an aircraft of this configuration could employ a ducted fan for propulsion or even a small turbojet. Centre-of-gravity control could be achieved with this version with ballast or with variable geometry wings as mentioned above, or possibly the twin booms 3A could be telescopic.

As a further (unillustrated) example of an aircraft according to the invention, a biplane version could be produced. Centre-of-gravity control could be achieved in this example by fore and aft movement of one of the planes, particularly if control surfaces were restricted to the alternative plane.

From the foregoing description and accompanying drawings it will be clear that passengers in each aircraft portrayed will be afforded a forward and downward view through the transparency 'T' unrestricted by any aircraft structure or powerplant. The entire propulsive system of each aircraft is located behind the passenger accommodation. Where the aircraft is propeller driven the propeller(s) may, in consideration of both aerodynamic efficiency and noise reduction, be shrouded, as indicated for example at 9A in FIGS. 2A, 2B. Also, propeller tip speeds must be kept to a minimum for minimum audible noise generation so that the propellers used will have both the largest practical diameter and the greatest practical number of blades. Engine mountings, particularly when engines are mounted in or on the fuselage, must be designed to transmit minimum vibration through the aircraft structure to the cabin 6, so that for example, damped resilient mountings may be incorporated.

In all the examples of the invention so far described it has been assumed that the aircraft has only a single powerplant. However, both for considerations of performance and safety multi-engined versions are also proposed. Thus, the powerplant of any of the embodiments described above could be replaced by, or supplemented with, for example a powerplant mounted on each wing of mainplane 2. These powerplants must be such as not to substantially obscure the effective field of view of passengers and may thus be for example "pusher" propellers located behind the trailing edge of each wing driven by suitable wing-mounted engines. Or combinations of the powerplants already described could be employed. In the FIGS. 1A, 1B; 2A, 2B and 5A, 5B examples twin engines could be mounted in the fuselage 1 driving the fan 7 or propellers 9 or 16 respectively, or even contra-rotating fans or propellers.

Referring now to FIGS. 6 to 10 there are illustrated in plan some examples of preferred seating arrangements within the cabin 5 for a pilot and 3 to 5 passengers. In these Figures passengers at the front and rear seating levels are indicated A1 and A2 respectively, and the pilot with his controls and instruments indicated B.

In the example of FIG. 6 two passengers are accommodated side by side at the front (lower) seating level and the pilot is accommodated at one side of the cabin at the rear (upper) seating level with a third passenger by his side.

In the example of FIG. 7 three passengers are accommodated side by side at the front seating level with the pilot situated centrally of the cabin above and behind them. If desired two further passengers may be accommodated at the rear seating level, one each side of the pilot.

The arrangement of FIG. 8 is similar to that of FIG. 7 except that the pilot is accommodated to one side of the cabin and a passenger (or even perhaps two) accommodated to the other side.

The arrangement of FIG. 9 is slightly different in that one passenger is accommodated at the front seating level with the pilot directly behind him at the rear seating level and two further passengers (indicated A3) are accommodated between them, one to each side of the cabin, and preferably at an intermediate seating level so as to afford them a view unobstructed by the foremost passenger.

FIG. 10 shows a seating arrangement similar to that shown in FIG. 8 but in which the cabin is divergent or "bubbled" to afford extra room for the passengers. In such a case the cabin will have a (preferably single-piece) "bubble" type transparency as provided on some helicopter types.

Various forms of cabin transparency T are illustrated in FIGS. 1A, 1B to 5A, 5B. The transparencies illustrated in FIGS. 1A, 1B, 2A, 2B and 4A, 4B may for example be embodied in an openable and closeable canopy for entry to and exit from the aircraft. Such a canopy may for example hinge upwardly or slide forwardly to open. Or the canopy may be in two halves hinging outwards from a central spine. The foremost part of the transparency in FIGS. 3A, 3B and 5A, 5B may similarly be embodied, or alternatively entry and exit may be afforded in these versions through side doors indicated at 6A, hinged along the line 6B.

Preferably the cabin transparency (or the foremost part in versions such as those of FIGS. 3A, 3B and 5A, 5B) will be in the form of a single piece of non-reflective transparent plastic. Where a very large area of transparency is provided it may be necessary to incorporate some supporting structure within that area, but any such structure will be kept to a minimum and not be such as to substantially obscure the field of view of passengers. That part of the transparency through which sky will normally be visible to the passengers may be tinted blue so as to give an impression of fine weather, and any transparency directly over the heads of the passengers or pilot darkly tinted or otherwise treated to filter excessive sunlight. To avoid passengers being alarmed on take off and landing, pilot-controlled blinds or shutters may be provided around the lower front transparent areas, particularly in such versions as illustrated in FIGS. 2A, 2B; 3A, 3B and 4A, 4B.

As indicated previously, in aircraft of the type with which the invention is concerned passenger comfort is of the essence. Thus for example it is proposed that each passenger be provided with an individual seat and which is preferably adjustable for height and femur length. Furthermore such seats may be able to swivel to aid the observation of various ground features and be lockable in a rearwardly-facing position in the event of an anticipated crash or heavy landing. Safety harnesses for passengers will preferably be of the inertia-reel types so that they may be worn throughout a flight but without restraining normal seated movements.

The cabin will preferably be fully air-conditioned and soundproofed. The interior of the cabin should be easily cleanable; the floor covering may thus be in the form of fitted plastics grids with a removable drip tray underneath. When the aircraft is operated on a set itinerary it is proposed that pre-recorded commentaries on the sights being seen be provided which can be relayed over individual headphones to each passenger; if required a number of separate channels relaying commentaries in different languages may be used.

It is further proposed that the cabin be made in the form of a "capsule" separable from the rest of the airframe so that in the event of, for example, a forced landing on water the cabin, provided perhaps with flotation bags, can be separated and the rest of the airframe allowed to sink.

As a further modification it is contemplated that the mainplane (and, if necessary, the tailplane also) be tiltable in flight to increase its angle of incidence with respect to the fuselage so that the aircraft can cruise in a somewhat nose-down attitude and thus increase the field of view of the ground afforded to the passengers for a given area of cabin transparency. If such a system be adopted the seats for passengers and pilot will preferably be able to tilt backwards to maintain their occupants in the normal seated position with respect to the horizontal.

Although the invention has been described with regard to its primary role as a vehicle for aerial sightseeing, many other applications readily come to mind wherein good visibility is of importance, such as military "quiet observation" or bombing direction; mapping, filming, surveying land resources and the like, or navigational training. Another important use is considered to be in the inspection of overhead power cables. In such a case an automatic pilot might be used operating from signals picked up from successive pylons or homing on a signal wire. A similar system could be used for the inspection of pipe lines.

I claim:

1. An aircraft with an improved field of view comprising:

a fuselage, thrust producing means, lift surfaces including a mainplane attached to said fuselage, and a cabin within and extending to and constituting the nose of said fuselage, the cabin enclosing seated accommodation for a plurality of passengers and for a pilot, said passenger accommodation comprising a plurality of passenger seats, said pilot accommodation comprising a pilot seat disposed behind and at a higher seating level than said passenger seats and having associated controls for said aircraft, said cabin having a cabin transparency comprising a substantially continuous area of transparent material extending rearwardly from the foremost part of the nose of said fuselage to said pilot seat to afford substantially unobstructed vision from the aircraft for respective passengers seated in a normal position upon said passenger seats and facing forwardly and to afford sufficient vision from the aircraft to pilot the same for a pilot seated in a normal position upon said pilot seat and facing forwardly, all of said thrust producing means being disposed substantially entirely behind all of said passenger and pilot seats, said mainplane being disposed substantially entirely behind all of said passenger and pilot seats and so as not to substantially reduce in any other normal flight attitudes of the aircraft that view of the ground which is afforded from the aircraft in straight and level flight for passengers and a pilot respectively seated in a normal position upon said passenger and pilot seats and facing forwardly, and said mainplane being selected to be efficient at airspeeds compatible with safe low flying for sightseeing or observation purposes.

2. An aircraft according to claim 1 having at least one further passenger seat alongside and at the same seating level as said pilot seat.

3. An aircraft according to claim 1 and in which:
said aircraft has twin booms extending rearwardly from said mainplane, one of said booms at either side of the rear of said fuselage,
said twin booms having twin fins, one located at the tail of each of said twin booms, and
said thrust-producing means being carried at the rear of said fuselage between and substantially at the same level as said twin booms.

4. An aircraft according to claim 1 further comprising:
a fin and tailplane assembly located at the tail of said fuselage,
said thrust producing means comprising a ducted fan carried by said fuselage.

5. An aircraft according to claim 1 further comprising:
a fin and tailplane assembly located at the tail of said fuselage,
said thrust producing means comprising a pusher propeller located behind said assembly and means for driving said propeller located within said fuselage.

6. An aircraft according to claim 1 further comprising:
a fin and tailplane assembly located at the tail of said fuselage,
said thrust producing means being carried by said fin.

7. An aircraft according to claim 1 further comprising:
a fin and tailplane assembly located at the tail of said fuselage,
said thrust producing means being carried by said fuselage.

8. An aircraft according to claim 1 and in which:
said plurality of passenger seats are arranged in a row substantially perpendicular to the longitudinal axis of the fuselage.

* * * * *